(12) United States Patent
Chiba

(10) Patent No.: US 6,896,216 B2
(45) Date of Patent: May 24, 2005

(54) FISHING REEL

(75) Inventor: Makoto Chiba, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 67 days.

(21) Appl. No.: 10/228,056

(22) Filed: Aug. 27, 2002

(65) Prior Publication Data

US 2003/0038200 A1 Feb. 27, 2003

(30) Foreign Application Priority Data

Aug. 27, 2001 (JP) ..................... P2001-256102

(51) Int. Cl.$^7$ ............................................. A01K 89/02
(52) U.S. Cl. ..................... 242/250; 242/225; 242/253
(58) Field of Search ................................ 242/243, 249, 242/253, 257, 250, 319, 225

(56) References Cited

U.S. PATENT DOCUMENTS

| 2,714,271 A | * | 8/1955 | Stratton | 43/21 |
|---|---|---|---|---|
| 2,743,067 A | * | 4/1956 | Stratton | 242/257 |
| 4,283,025 A | * | 8/1981 | Whisenhunt | 242/250 |
| 4,344,587 A | * | 8/1982 | Hildreth | 242/390.9 |
| 4,515,324 A | * | 5/1985 | Barton | 242/250 |
| 4,679,346 A | * | 7/1987 | Angelety, Sr. | 43/20 |
| 4,784,346 A | * | 11/1988 | Steffan | 242/250 |
| 4,932,602 A | * | 6/1990 | Scott | 242/394.1 |
| 5,454,761 A | * | 10/1995 | Takahashi et al. | 474/253 |
| 5,531,650 A | * | 7/1996 | Azuma | 474/260 |
| 5,556,047 A | * | 9/1996 | Nanbu | 242/250 |
| 5,772,140 A | | 6/1998 | Murayama | |
| 5,954,285 A | * | 9/1999 | Whisenhunt | 242/250 |
| 6,012,665 A | * | 1/2000 | Olona | 242/250 |
| 6,126,104 A | * | 10/2000 | Kellerman | 242/225 |
| 6,287,230 B1 | * | 9/2001 | Okuno | 474/237 |
| 6,358,170 B1 | * | 3/2002 | Fujiwara | 474/264 |

FOREIGN PATENT DOCUMENTS

| JP | 11-32632 | 2/1999 |
|---|---|---|
| JP | 2001-8590 | 1/2001 |

\* cited by examiner

Primary Examiner—Emmanuel Marcelo
(74) Attorney, Agent, or Firm—Sughrue Mion, PLLC

(57) ABSTRACT

A belt and pulleys are used as a power transmitting unit in a fishing reel for avoiding uncomfortable vibration or noises while fishing. A spool motor is supported in a motor receiving case provided at front and lower parts between both side frames, and a toothed pulley 21 is urged in the other side of a rotating shaft and is made detent. Another toothed pulley is fitted in a detent portion of a spool shaft by an E-ring, and a toothed belt is expanded between the toothed pulley and the other toothed pulley.

13 Claims, 10 Drawing Sheets

FISHING REEL

BACKGROUND OF THE INVENTION

This invention relates to a fishing reel in which a power transmission instrument of a drive mechanism for driving composing parts provided within a reel main body is improved.

In a related art, the fishing reel supports, within the reel main body, a drive mechanism for winding a fishing line on a spool held by the reel main body and a fishing line parallel winding mechanism for winding the fishing line in parallel on the spool.

The drive mechanisms generally carry out power transmission through a gear train between a plurality of separate drive shafts. For purposes of reducing noises of the gears in the fishing reel, heightening precision, lightening weight, and making compact, Patent Laid Open No. 32632/1999 and No. 8590/2001 disclose fishing reels with pulleys and belts.

However, in cases of structures of Patent Laid Open No. 32632/1999 and No. 8590/2001, since the power transmission is performed by driving the belt in parts not effected with load, troubles are less to occur, but in case the disclosed fishing reels are used in parts transmitting a large power, the belt has difficulty about endurance, and such a trouble might occur where the belt is broken due to work for a long duration.

If the belt is driven in the part of transmitting the large power, it is subject to wearing, and as slippage is created between the pulleys and the belt, an earlier improvement has been demanded.

The fishing reel has a structure that an electric fishing reel is equipped with a spool motor for rotating and driving the spool, so that the spool is driven by power thereby and a fishing line is wound on the spool.

In particular, recently, the spool motor is arranged in a dead space between both side plates in front of the spool of the reel main body so as to make the electric reel compact as known in FIG. 13, and such a technique is known that a planetary gear mechanism is divided in the vicinity of a motor output part and in the vicinity of the spool for avoiding partiality in weight.

For transmitting the driving force of the spool motor to the spool, the force is sent in the order of (i) motor 62→ (ii) reduction mechanism F→ (iii) gear train G→ (iv) spool shaft 7→ (v) reduction mechanism H→ (vi) spool 3. In case of making the reel more compact, since the reduction mechanism F of (ii) is provided together with the motor, the width of the reel main body in the vicinity of the motor is not made small, so that if the reduction mechanism F is moved into the interior of the spool for reducing the width near the motor in order to make the reel more compact, a plurality of follower gears disposed from the motor to the reduction mechanism rotate at high speed, and a grease coated on a tooth flank is blown by a centrifugal force.

If the grease is blown off from the tooth flank, the tooth flank is effected with intensive abrasion or much corrosion by a seawater. Thus, a limitation exists in making the reel compact.

Further, being many number of gears, noises or vibrations are large, so that there are inconveniences that a grip and holding property of the reel is inferior, and no concentration can be made on fishing, and so the earlier improvement is required.

Problems of the related art are that if the pulleys and the belt are used for transmitting a power in the drive mechanism of the fishing reel, difficulty is present in endurance of the belt, and if the belt is worn owing to using for a long term, slippage is occurred between the pulleys and the belt.

Further, if using the gear train for transmitting the power in the electric fishing reel, it is necessary to equip the reduction mechanism for reducing the output from the motor, and the number of gears becomes large, which causes noises, and if the reduction mechanism F is moved into the interior of the spool for reducing the output of the motor and reducing the width near the motor in order to make the reel more compact, a plurality of follower gears disposed from the motor to the reduction mechanism rotate at high speed, and the grease coated on the tooth flank is blown by the centrifugal force.

If the grease is blown off from the tooth flank, the tooth flank is effected with the intensive abrasion or much corrosion by the seawater. Thus, a limitation exists in making the reel compact.

Further, being many number of gears, noises or vibrations are large, so that there are inconveniences that a grip and holding property of the reel is inferior, and no concentration can be made on fishing.

SUMMARY OF THE INVENTION

In view of the above mentioned shortcomings, it is objects of the invention to offer such a fishing reel of improved endurance by using a core wired belt for serving the drive force transmitting mechanism constituted by the pulleys and the belt, and offer such a fishing reel with prevention of a grease coated on the tooth flank from flying off by providing the drive force transmitting mechanism composed of the pulleys and the belt.

In order to solve the aforesaid object, the invention is characterized by having the following arrangement.

A fishing reel comprising:
a reel main body; and
a drive mechanism provided in the reel main body for driving composing parts of the fishing reel, the driving mechanism including,
  plurality of pulleys mounted on a plurality of driving shaft, respectively, and
  a belt including core wires therein for transmitting power between the plurality of pulleys.

The fishing reel may have a spool motor provided in the reel main body for driving the spool, and the plurality of pulley and the belt constitute a power transmission unit for transmitting the power from the spool motor to the spool.

The fishing reel has the spool motor provided outside of the spool.

The pulley may be toothed, and the belt is toothed to be in mesh with the toothed pulley.

The belt includes a rubber and the core wires made of fiber having larger tensile strength than that of a belt base material of the belt.

The present invention is also directed to a fishing reel that comprises

Core wires are arranged within the belt.

A spool motor is provided in the reel main body for driving the spool, and the plurality of pulleys and the belt constitute a power transmission unit for transmitting the power from the spool motor to the spool.

The spool motor is provided outside of the spool.

The spool is toothed, and the belt is toothed to be in mesh with the toothed pulley.

DETAILED DESCRIPTION OF PREFERRED EMBODIMENTS

First Embodiment

Figure 1:
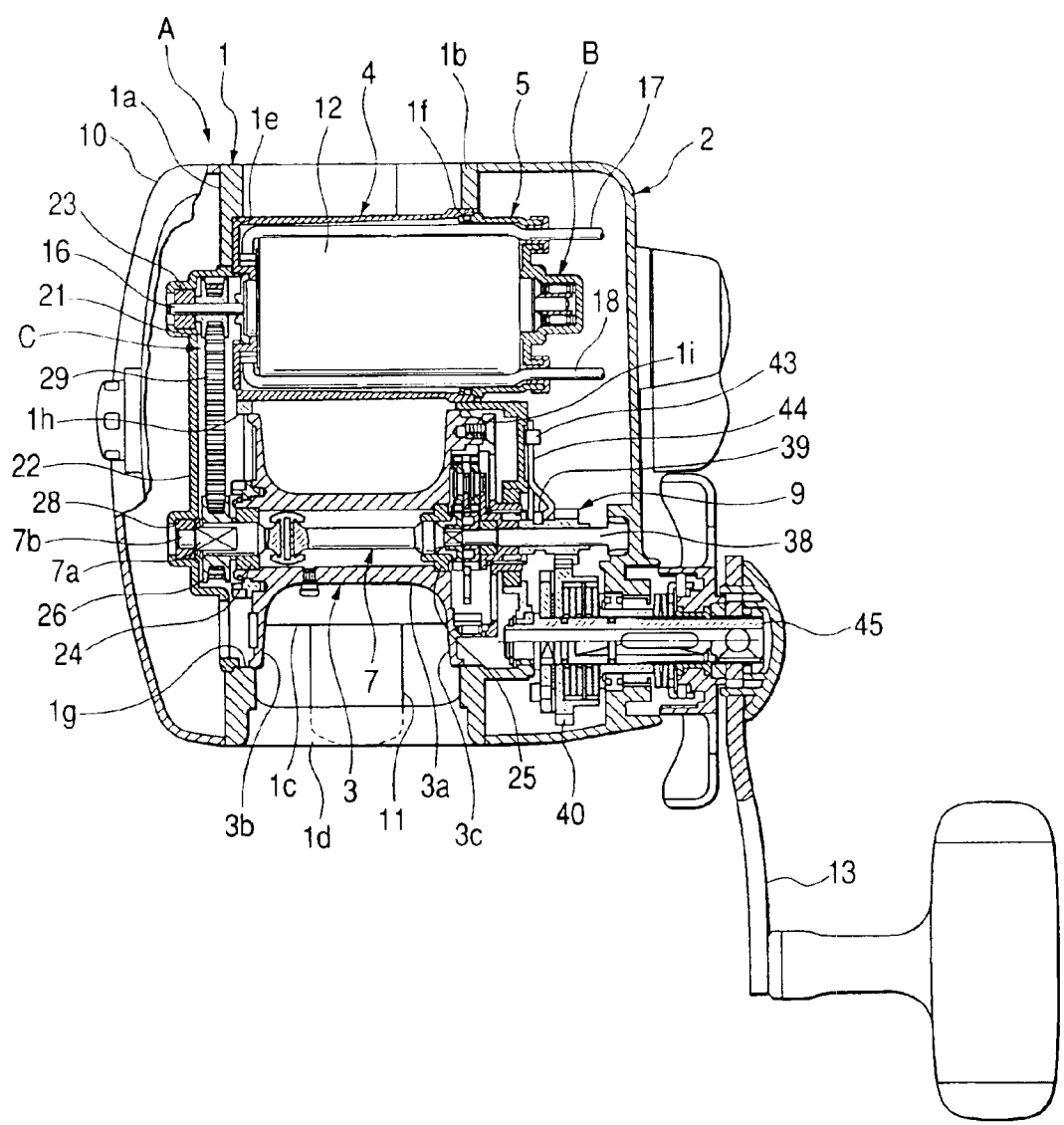
FIG. 1 is a cross sectional side view of an electric reel.
Figure 2:
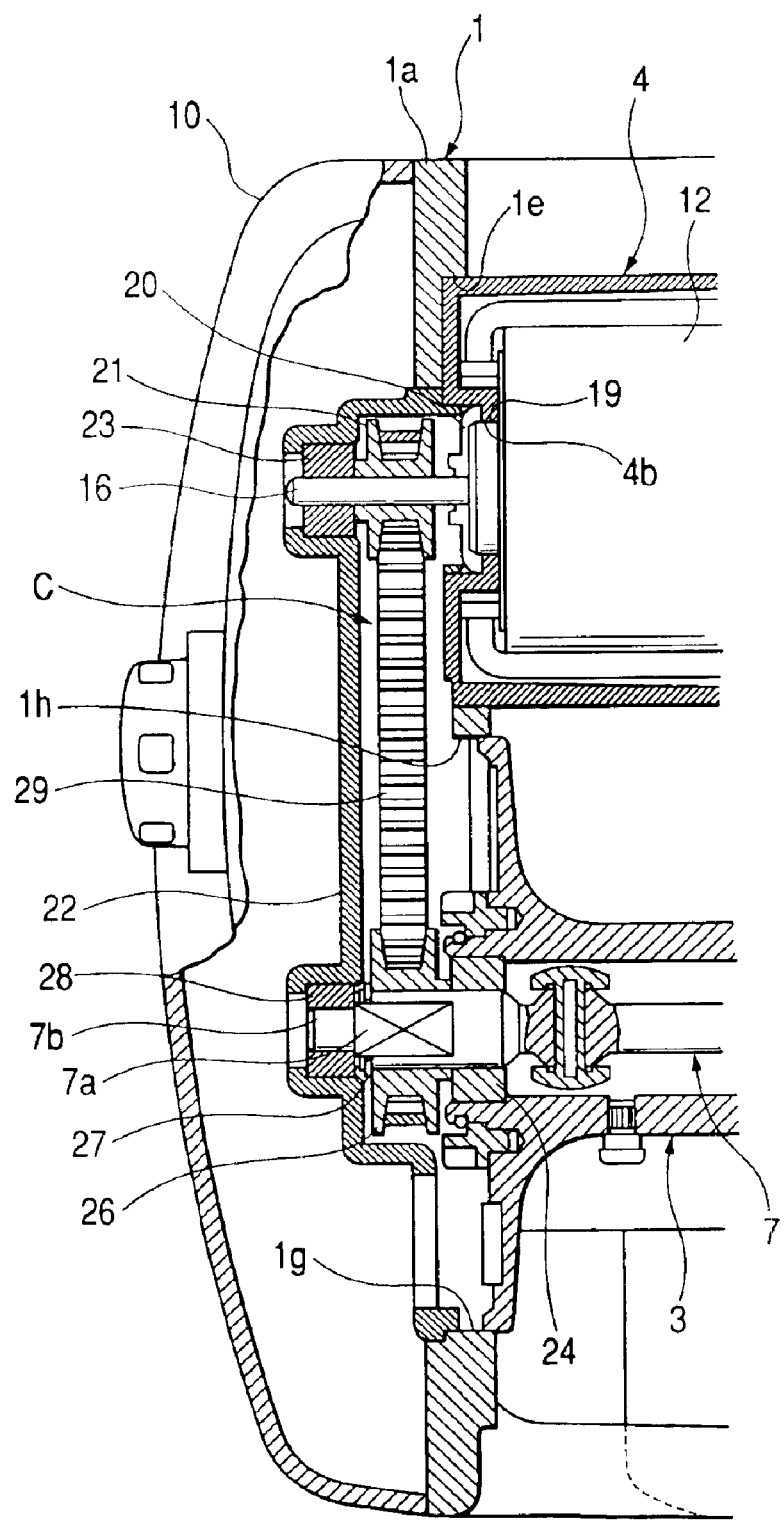
FIG. 2 is an enlarged cross sectional side view opposite to a handle of the electric reel.
Figure 3:
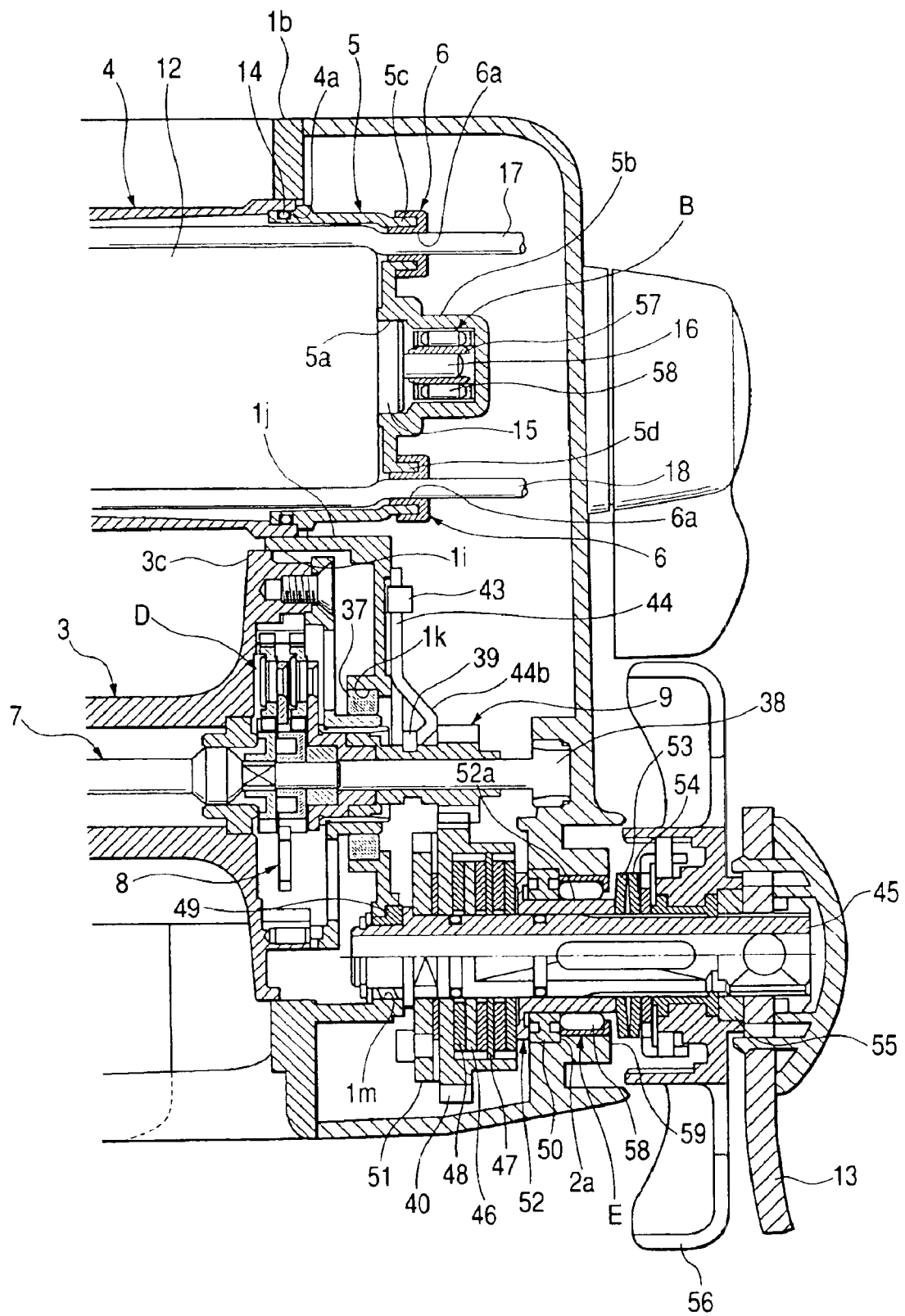
FIG. 3 is an enlarged cross sectional side view of the handle side of the electric reel.
Figure 4:
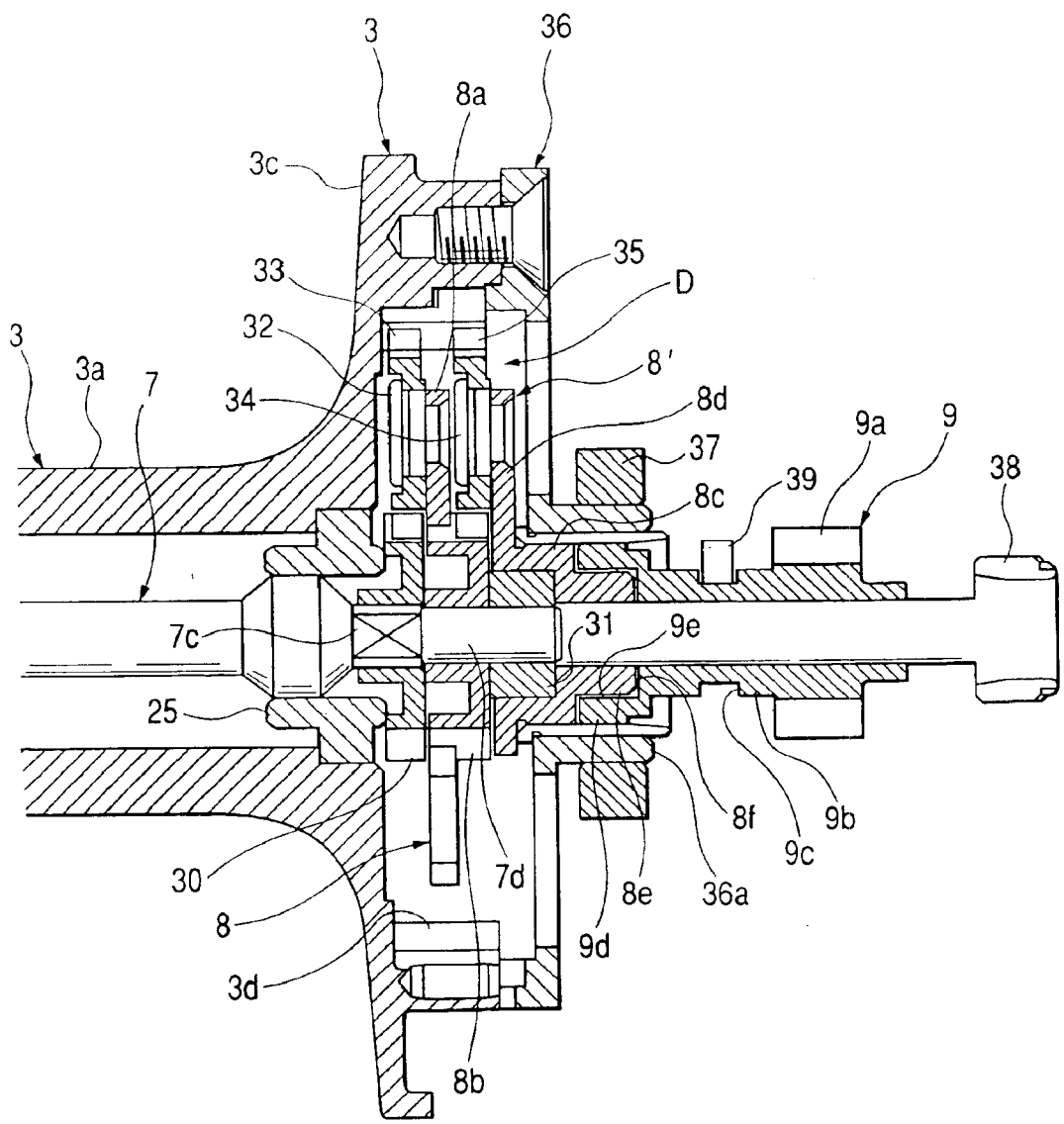
FIG. 4 is an enlarged cross sectional plan view.
Figure 5:
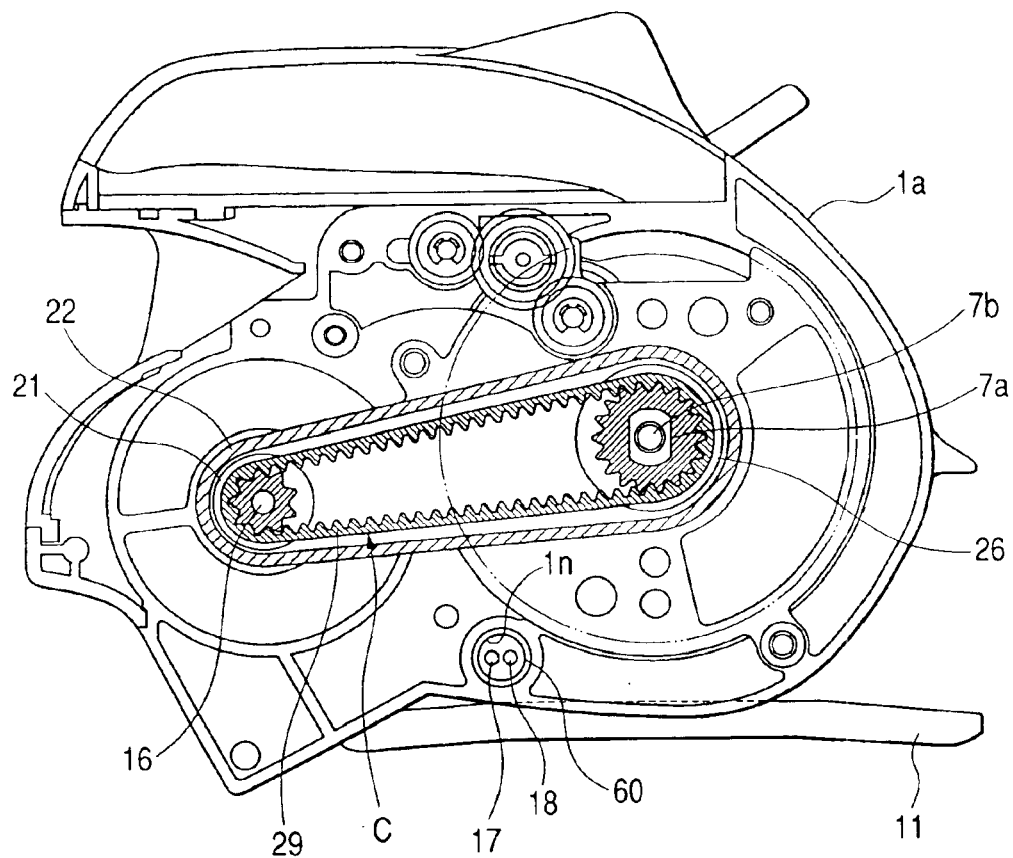
FIG. 5 is a side view of an inside of a side panel opposite to the handle of the electric reel.
Figure 6:
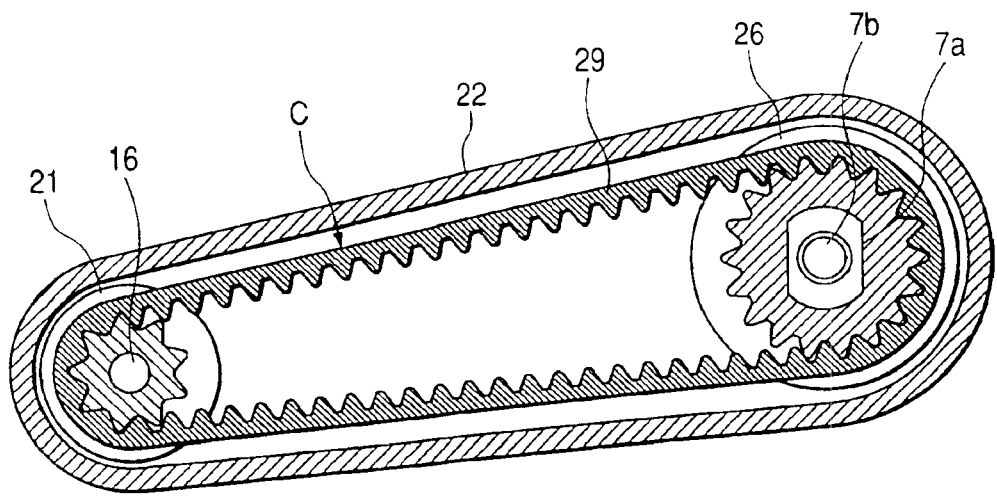
FIG. 6 is an enlarged cross sectional side view of a toothed pulley and a toothed belt.
Figure 7:
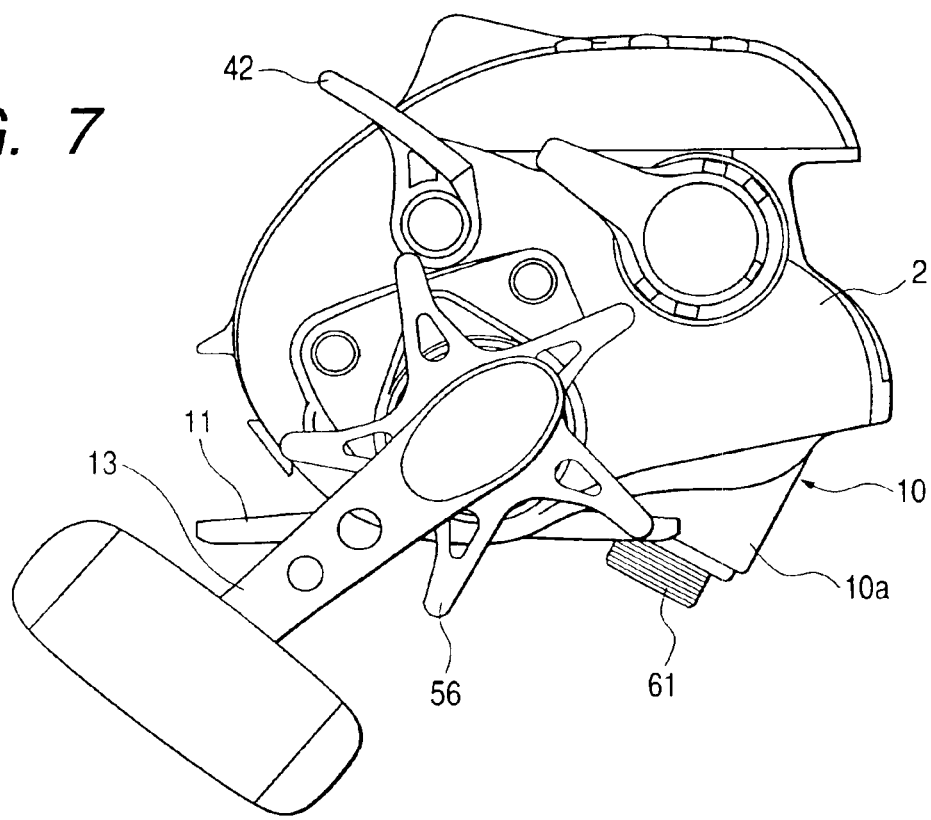
FIG. 7 is a side view opposite to the handle of the electric reel.
Figure 8:
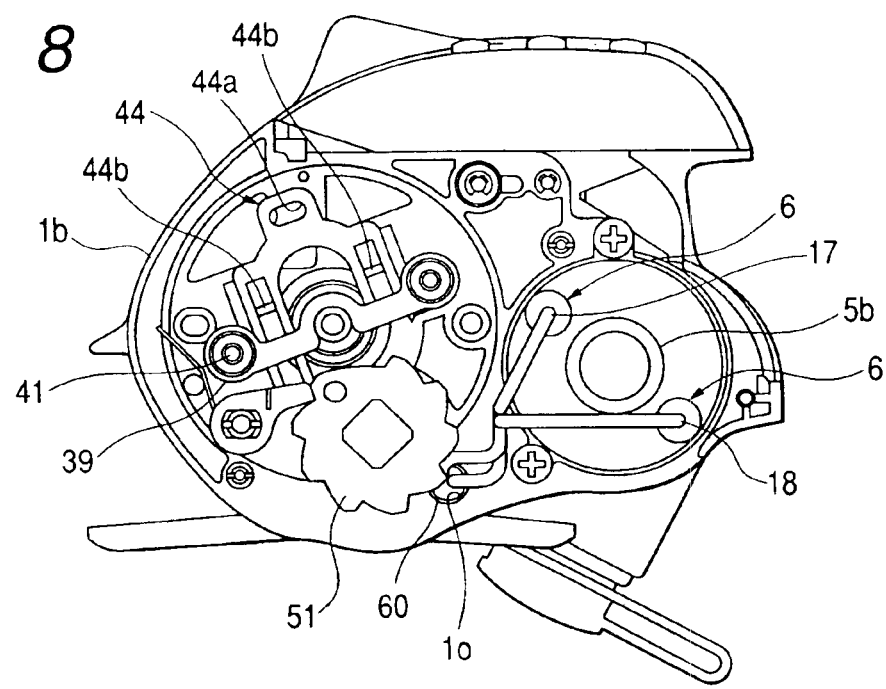
FIG. 8 is a side view of the inside of the side panel of the handle side of the electric reel.

The invention will be explained with reference to an embodiment shown in the attached drawings. FIGS. 1 through 8 are a first embodiment. FIG. 1 is a cross sectional side view of the electric reel, FIG. 2 is an enlarged cross sectional side view opposite to a handle side of the electric reel, FIG. 3 is an enlarged cross sectional side view of the handle side of the electric reel, FIG. 4 is an enlarged cross sectional plan view, FIG. 5 is a side view of an inside of a side panel opposite to the handle of the electric reel, FIG. 6 is an enlarged cross sectional side view of toothed pulleys and a toothed belt, FIG. 7 is a side view opposite to the handle of the electric reel, and FIG. 8 is a side view of the inside of the side panel of the handle side of the electric reel.

The reel main body A of the electric fishing reel comprises a frame 1 and a side plates 10, 2.

The frame 1 includes right and left side frames 1a and 1b, a support (not shown), a stationary plate 1c of a reel leg 11, and a finger-rest 1d, which are formed integrally each other. The side plates 10 and 2 are attached to outside of the right and left side frames 1a and 1b, respectively, in a state that the right and left side frames are held in parallel.

The spool 3 is rotatably supported between both side frames 1a, 1b of the inside.

A motor receiving case 4 is fitted in through-holes 1e, 1f bored at front and lower parts of both side frames 1a, 1b.

The spool 3 can be rotated by both a spool motor 12 furnished within the motor receiving case 4 and a handle 13 provided outside of a side plate 2.

The motor receiving case 4 is provided between both side frames 1a, 1b, and as shown in FIGS. 1 and 3, a cover 5 is fitted at a right-side opening 4a through a water proof O ring 14.

The spool motor 12 within the motor receiving case 4 is supported so that a cylindrical body 15 is held in a central recess 5a of the cover 5.

The cover 5 is projected at a center with a cylindrical part 5b and a one way-clutch B is provided within the cylindrical part 5b. The one way-clutch B is engaged with an outer periphery of one end of a rotation shaft 16 of the spool motor 12.

Elastic members 6 are fitted on and fixed to the cylindrical parts 5c and 5d formed on the cover 5, respectively. Feeder codes 17 and 18 are inserted into through-holes 6a and 6b formed through the respective elastic members 6, respectively.

A cylindrical body 19 at the other side of the spool motor 12 is supported by a cylindrical part 4b of the motor receiving case 4.

The cylindrical body 19 is projected with the rotating shaft 16, on an outer periphery of which a water proof ring 20 is provided, and a toothed pulley 21 is non-rotatably fitted to the other-side periphery of the rotating shaft 16 which is provided to a bearing 23 equipped to a holding member 22.

The holding member 22 is fixed to a through-hole 1g in a left-side frame 1a.

The spool 3 is formed with a fishing line winding drum 3a, a one-side flange 3b and the other-side flange 3c.

The one-side flange 3b is inserted into a large diameter through-hole 1h formed through the left side frame 1a, while the other-side flange 3b is inserted into a large diameter through-hole 1i formed through the right side frame 1b.

The spool 3 is pivoted to a spool shaft 7 via a bearing 24 and a bearing 25 furnished at both ends within the fishing line winding drum 3a.

The spool shaft 7 is formed at one left side (FIG. 2) with a detent portion 7a and a small diameter portion 7b. The detent portion 7a is provided with a toothed pulley 26 and prevented from getting out by an E-ring 27.

The small diameter portion 7b is fitted in a bearing 28 provided to the holding member 22 furnished to the left-side frame 1a.

A toothed belt 29 is extended between the toothed pulley 26 and the toothed pulley 21.

The toothed pulleys 21, 26 and the toothed belt 29 constitute a power transmission instrument C.

The spool shaft 7 is formed at right side (FIG. 4) with a detent portion 7c and a small diameter portion 7b. The detent portion 7c is provided with a pinion 30.

The small diameter portion 7d is fitted to a bearing 31 and a first rotor 8 of a reduction mechanism D constituted by a planetary gear.

A planetary gear 33 is provided to a shaft portion 32 secured on a plate part 8a of the first rotor 8a, and the planetary gear 33 is in mesh with the pinion 30.

The first rotor 8 is centrally formed with a gear 8b.

A bearing 31 is engaged with a cylindrical portion 8c of a second rotor 8', and a planetary gear 35 is provided to a shaft portion 34 secured to a plate part 8d of the second rotor 8'.

The planetary gear 35 is in mesh with a gear 8b.

A cylindrical portion 8e is integrally formed with a cylindrical portion 8c of the second rotor 8'.

An engaging part 8f is formed at an end of the cylindrical portion 8e.

The cylindrical portion 8e is fitted in a cylindrical portion 36a of rotary disc 36 screwed outside of the other-side flange 3c.

An outer wheel gear 3d is formed in an outside recess of the other-side flange 3c of the spool 3, and is in mesh with the planetary gears 33, 35 of the reduction mechanism D.

The cylindrical portion 36a is fitted in the bearing 37 attached to a through-hole 1k formed at a center of a large diameter disc-like inside plate 1j formed in the right-side frame 1b.

Within the inside of the side plate 2, a shaft 38 is fixed at one end, and a pinion 9 is fitted on the shaft 36 movably in an axial direction.

The shaft 38 is fitted at the other end in a bearing 31 provided to the cylindrical portion 8a of the rotor of the reduction mechanism D.

The pinion 9 is formed with a gear 9a, a one-side cylindrical portion 9b, a peripheral groove 9c formed on the outer periphery of the cylindrical portion 9b, and an engaging portion 9e inside a cylindrical portion 9d being integral with the cylindrical portion 9b and having a larger diameter than that of the same.

The peripheral groove 9c is fitted with a clutch plate 39. A clutch mechanism is constituted by the engaging portion 9e of the pinion 9 and an engaging portion 8f formed on the rotor 8 of the reduction mechanism D, and the clutch is turned ON by engaging the engaging portion 9e and the engaging portion 8f.

The pinion 9 is in mesh with a drive gear 40.

The clutch plate 39 is, as seen in FIG. 8, slidably fitted to supporters 41, 41 embedded in the right-side frame 1b, and is biased to be ON by a spring (not shown).

As shown in FIG. 7, a through-hole (not shown) is formed at the upper side of the side plate 2 so as to rotatably fit a clutch operator 42.

The clutch operator 42 is provided with an eccentric pin 43 to be moved by turning the clutch operator 42, and the eccentric pin 43 is, as shown in FIG. 3, inserted in an elongated engaging portion 44a of the clutch operator 44 as shown in FIG. 8.

A clutch operating plate 44 is provided with cams 44b, and the clutch plate 39 is pushed up by the cams 44b and is turned OFF.

The drive gear 40 is mounted on a handle rod 45 rotatably and movably in the axial direction, and is frictionally connected with braking plates 46, 47 via a frictional plate 48.

The handle rod 45 is provided at its one end to a through-hole 1m of the disc-like inside plate 1j of the right-side frame 1b via a metal bearing 49, while the handle rod 45 is pivoted at the other end to the side plate 2 via a bearing 50 and the one-way clutch E which are fitted in a through-hole 2a of the side plate 2.

The handle rod 45 is non-rotatably mounted on a ratchet 51, a braking plate 46 and a presser 52, and is rotatably mounted on the drive gear 40, the frictional plate 48, the braking plate 47 and springs 53, 54.

The braking plate 47 is non-rotatably engaged with the drive gear 40.

The handle rod 45 is defined with a thread screwed with a nut 55, on an outer periphery of which a drag brake adjusting thumb 56 is non-rotatably mounted.

The one-way clutch B is constituted so that a ring 57 fixed to the outer periphery of the rotary shaft 16 is made an inner wheel, a plurality of bar-like rotating members 58 are mounted on the outer periphery of the ring 57, and an outside cylindrical portion 5b of the cover 5 is made an outer wheel.

The one-way clutch E is constituted by a ring 52a of the presser 52 as an inner wheel, the plurality of bar-like rotating members 58 mounted on the outer periphery of the ring 52a, and the outer wheel 59.

Each of the cylindrical portion 5b and the inner periphery of the outer wheel 59 has a region (not shown) where the bar-like rotating members 58 freely rotates and a region (not shown) where the rotation is inhibited.

Feeder codes 17, 18 of the spool motor 12 are passed through a cylindrical body 60 fitted to through-holes 1n, 1o bored at parts of the side frames 1a, 1b between the spool 3 and the motor receiving case 3 so as to be pulled out from the side plate 2 to the side plate 10.

The side plate 10 is provided at a center in a lower side with a projection 10a and at a lower rear face with an electric feeder connection 61, while the feeder codes 17, 18 are connected at the respective ends to the inside terminals of the electric feeder connection portion 61.

The electric feeder connection portion 61 is detachably connected on the outside thereof with a connector (not shown), to which an alligator grip coupled with an external feeder code is connected, and is connected to an external source battery.

With respect to actuation of the electric fishing reel, when the spool motor 12 is rotated to wind the fishing line on the spool 3, the spool shaft 7 and the pinion 30 are rotated via the toothed pulley 21, the toothed belt 29 and the toothed pulley 26, and the spool 3 is rotated via the reduction mechanism D.

At this time, the rotation of the pinion 9 is stopped by the one-way clutch E.

Next, when the handle 13 is rotated in a direction of winding the fishing line on the spool 3, the spool 3 is rotated via the drive gear 40 frictionally connected to the handle shaft 45, the pinion 9 and the rotor 8.

At this time, the reverse rotation of the spool shaft 7 is stopped by the one-way clutch B.

When the electric fishing reel is constituted as mentioned above, an output of the spool motor 12 can transmit power to the spool shaft 7 and the spool 3 not via the gear train but via the power transmission instrument C comprising the toothed pulley 21, the toothed belt 29 and the toothed pulley 26, so that the power transmission is available to the spool 3 without being influenced by position or orientation of the spool motor 12. It is no longer necessary to alter designs in company with alteration in position of an idle gear caused by altering the gear ratio, so that plenty of optimum gear ratios may be arranged in response to fishing ways, not taking unnecessary cost.

Enabling to reduce the number of gears, the noise of the reel can be reduced, and it is easy to confirm informing sounds issued at working various functions of the reel, and troubles by forgetting operations can be avoided.

There happen neither abrasion nor corrosion which are generated by an oil-shortage when transmitting the power not via the reduction mechanism F, the grease splashes from the tooth flank of the gear, and troubles are greatly reduced.

By furnishing the planetary gear mechanism within the spool 3 or to the side plate of the handle side, the spool motor 12 may be made large scaled, not enlarging the reel, and further by changing the power transmission part at high speed rotation to the belt driving, the quiet is possible, and all troubles caused when using the gears can be removed.

In the above explanation, with respect to the frame 1, as one body, both right end left frames 1a, 1b, the stationary plate 1c of the reel leg 11 and a finger-rest 1d are integrally formed in the state that both right and left frames 1a, 1b are held in parallel, but it is possible that these respective members are formed separately and both right and left frames 1a, 1b are held in parallel.

In addition, the motor receiving case 4 maybe formed as one body with the frame body 1, not separated therefrom.

In the above explanation, the spool motor 12 is supported within the motor receiving case 4 provided between the left and right side frames 1a, 1b, but it is also possible that the spool motor is received in the side plate 10 in parallel to the left side frame 1a so as to rotate the toothed pulley 21 via a bevel gear or a worm gear.

Second Embodiment

Figure 9:
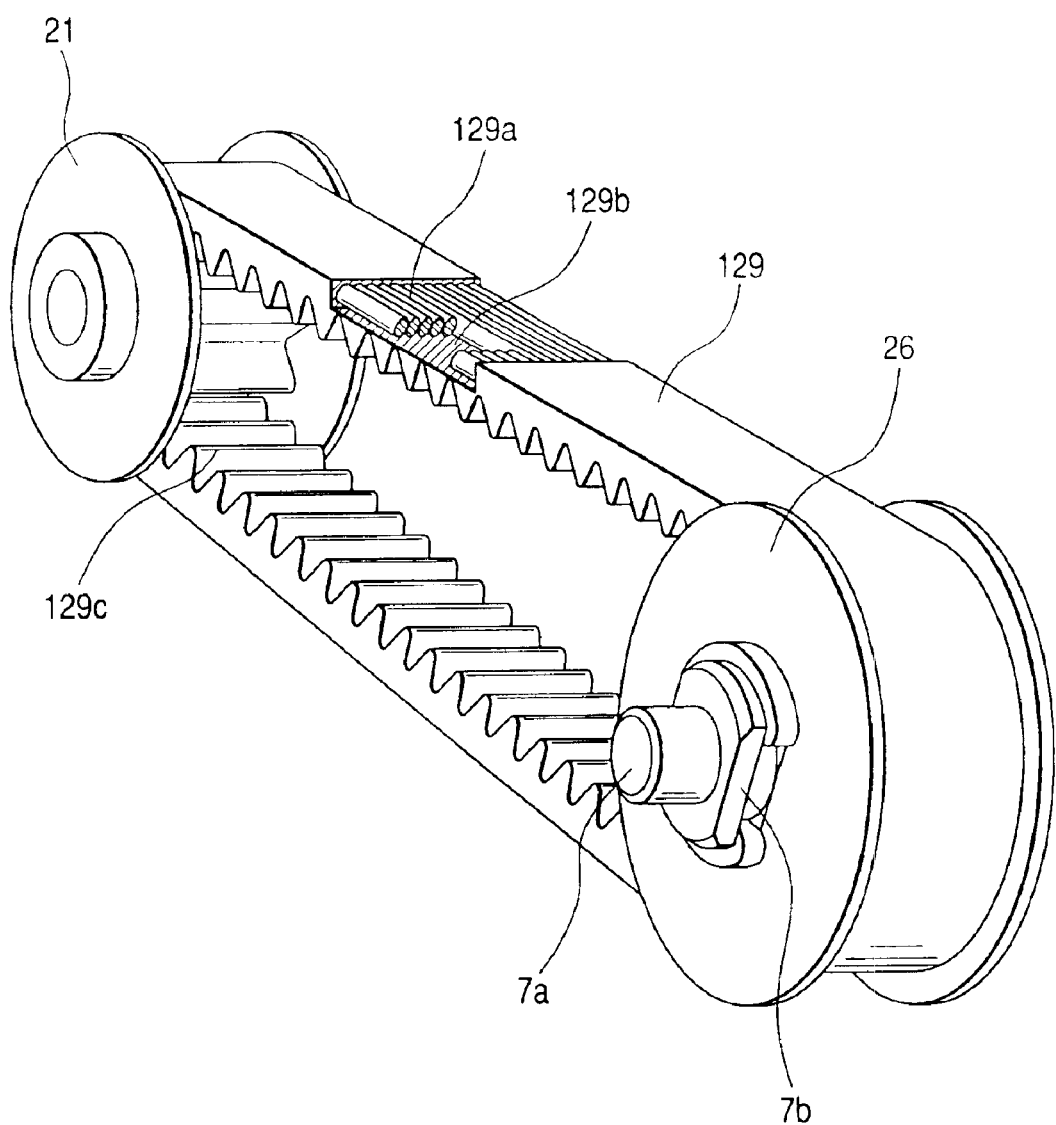
FIG. 9 is a second embodiment of a cross sectional perspective view.

FIG. 9 is a second embodiment showing a cross sectional perspective view.

The second embodiment is a modified example of the toothed belt 29 according to the first embodiment. A toothed belt 129 according to the second embodiment is constituted by a rubber 129a and core wires 129b. The rubber 129a is formed with a material such as chloroprene rubber or polyurethane. The core wires 129b is made of glass fiber or aramid fiber having larger tensile strength than that of a belt base material and is provided at the interior of the rubber 129a of a toothed belt 129. Other structures are the same as those of the first embodiment, and explanation will be omitted.

By forming the core wired toothed belt 129 as mentioned above, the belt is less to be elongated so that pitches of the belt teeth and length of the belt are kept proper, and the toothed pulleys 21, 26 are correctly in mesh with the toothed belt 129, and flat-abrasion in belt teeth is solved and endurance of the belt is increased. In addition, as vibration due to bad mesh between the toothed belt 129 and the toothed pulleys 21 is solved, a comfortable fishing operation can be carried out. Further, by using the core wires, the strength of the belt is increased, and it is possible to use belts of narrow width and miniaturize the belt driving part, i.e., the reel main body.

Third Embodiment

Figure 10:
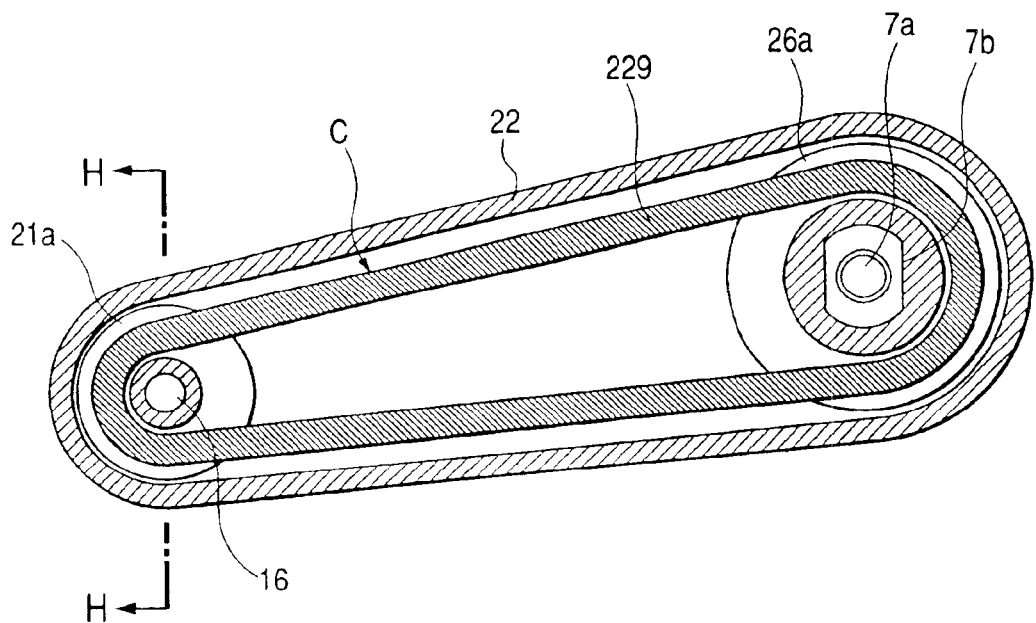
FIG. 10 is an enlarged cross sectional side view of the pulleys and the belt.
Figure 11:
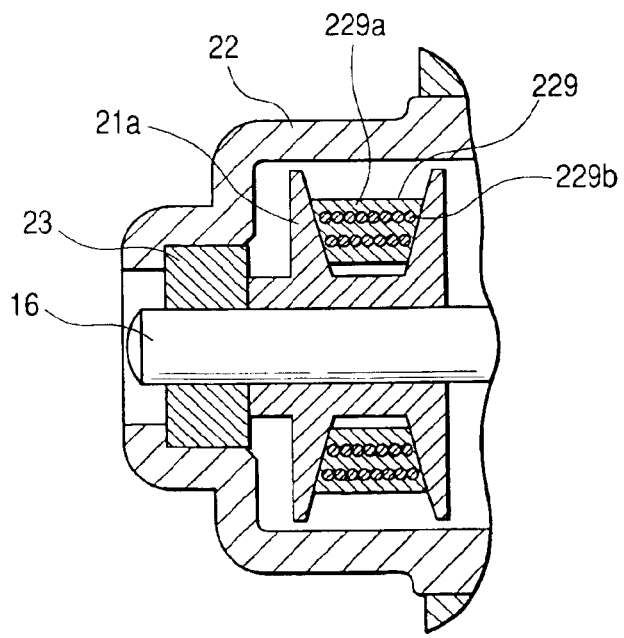
FIG. 11 is a cross sectional view along H—H of FIG. 10.
Figure 12:
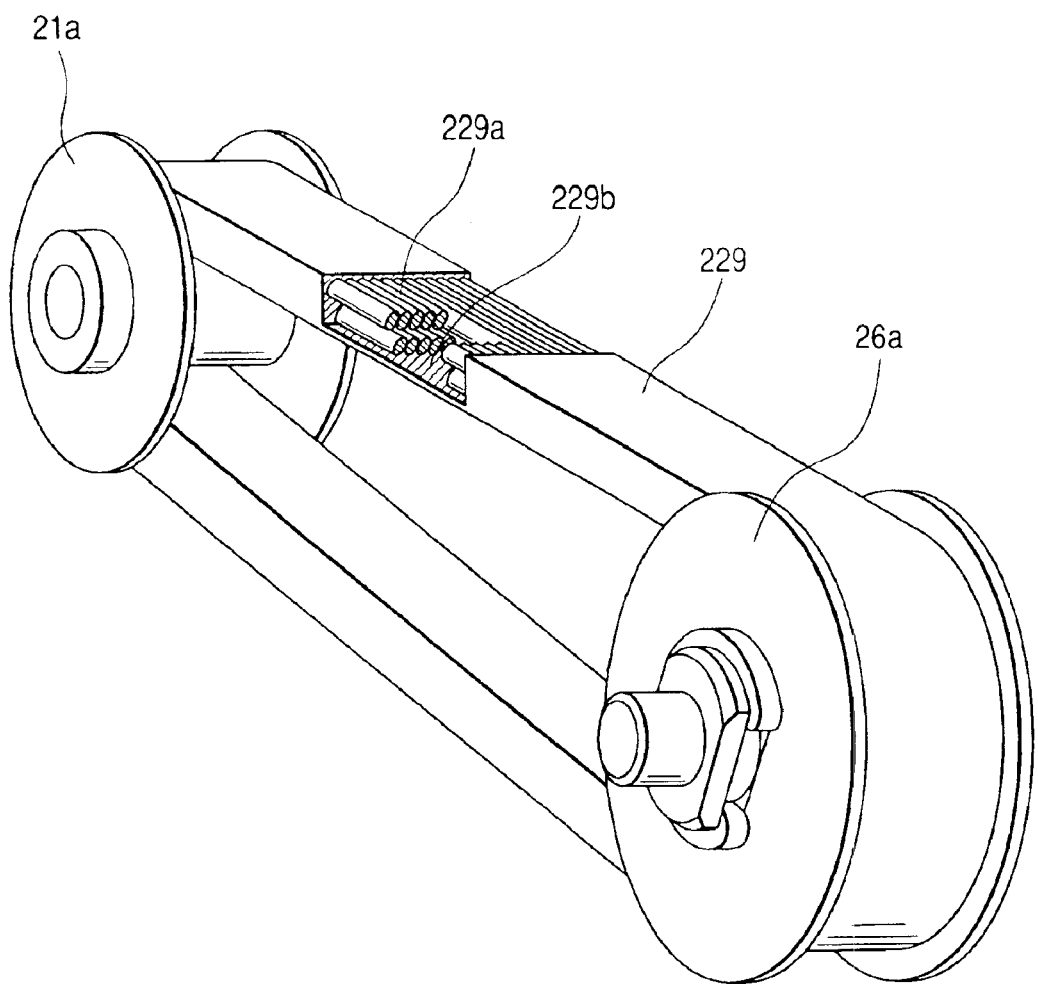
FIG. 12 is a cross sectional perspective view of the pulleys and the toothed belt.
Figure 13:
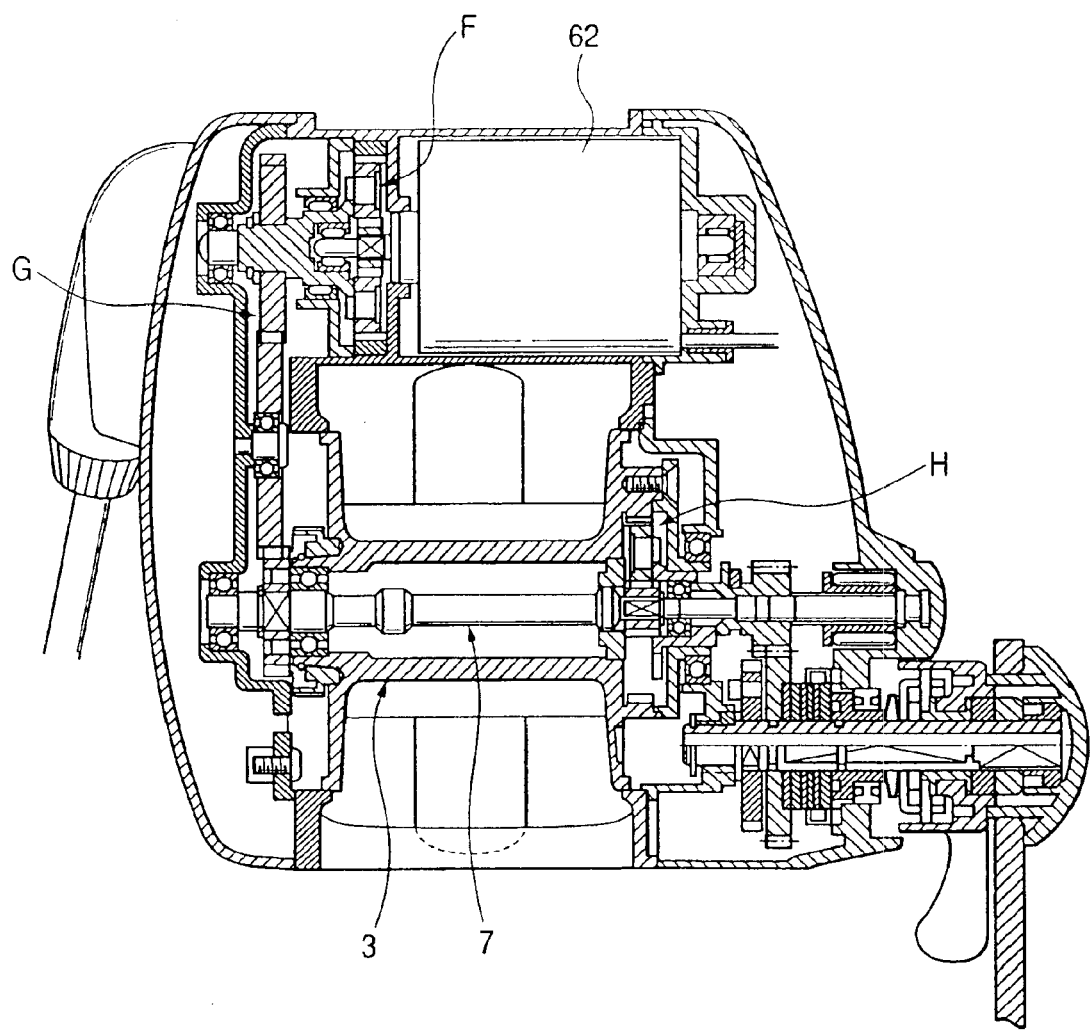
FIG. 13 is a cross sectional side view of a conventional electric reel.

FIGS. 10 to 12 show a third embodiment. FIG. 10 is an enlarged cross sectional side view, FIG. 11 is a cross sectional side view along H—H of FIG. 10, and FIG. 12 is perspective views of the pulley and the belt of FIG. 10.

The third embodiment is modified examples of the toothed pulleys 21, 26 and the core wired toothed belt 129 according to the second embodiment, in which pulleys 21a, 26a where the teeth are removed from the toothed pulleys 21, 26 and a belt 229 where the teeth 129 are removed from the core wired toothed belt 129 are employed. Other structures are the same as those of the first and second embodiments, and explanation will be omitted.

By using the core wired belt 229 as mentioned above, strength and endurance are increased, and belts of narrow width may be employed. There is no insufficient contacting pressure between the belt 229 and the pulleys 21a, 26a owing to elongation of the belt 229, so that failure of the power transmission is solved and poor power transmission is moderated without using the toothed pulley, and it is no longer necessary to form tooth shapes in the pulleys and the belts, and the cost may be saved to be cheap, and the power transmission instrument may be used by the belt in the reel of low cost.

It is more effective to utilize the core wired belt 229 to a level wind drive mechanism effected with no high load, and if combining it with the winding power transmitting mechanism of the first and second embodiments, the reel can be quiet, and it is easy to confirm informing sounds issued at working various functions of the reel, and troubles by forgetting operations can be avoided.

The invention is practiced in the embodiments as mentioned above, and displays effects as mentioned under.

According to the invention, in the case of using the drive mechanism composed of the pulleys and the belt as the power transmitting unit, strength and endurance of the belt are improved by using the belt with the core wires, such a trouble may be avoided that the belt is broken owing to working for a long term, and the belt of narrow width may be employed, so that the belt driving parts, that is, the reel main body may be miniaturized.

Enabling to reduce the number of gears, noise of the reel can be reduced, and it is easy to confirm informing sounds issued at working various functions of the reel, and troubles by forgetting operations can be avoided.

According to the invention, in case of using the belt drive instrument having the pulleys and the belt as the spool winding drive mechanism, gear noises are reduced.

Further, even in the case of transmitting force between separate shafts, the force can be transmitted without increasing parts, enabling to cost down and restrain increasing of the weight.

A layout of the handle shaft and the spool shaft, and selection of the gear ratio are made easy, the degree of freedom in designing is increased.

According to the invention, even in the case of using the belt drive for transmitting the force, receiving the high load as in the fishing-line winding drive mechanism, the strength and the endurance of the belt are improved by using the belt with the core wires, such a trouble may be avoided that the belt is broken owing to working for a long term, and the belt of narrow width maybe employed, so that the reel main body may be miniaturized. In addition, the belt may be prevented from elongation, shortage in the transmitting force of the power transmission instrument may be solved.

According to the invention, the output of the spool motor can transmit the power to the spool shaft and the spool not via the gear train but via the power transmitting unit comprising the pulleys and the belt and enabling to reduce the number of gears, the reel can be made quiet, and it is easy to confirm informing sounds issued while working various functions of the reel, and troubles by forgetting operations can be avoided.

There occur neither abrasion nor corrosion which are generated by an oil-shortage when transmitting the power not via the reduction mechanism F, the grease splashes from the tooth flank of the gear, and troubles are greatly reduced.

According to the invention, as the spool motor can be furnished outside of the reel main body, the reel can be made compact while securing the capacity of winding the fishing line. At the same time, the output of the spool motor can transmit the power to the spool shaft 7 and the spool 3 not via the gear train but via the power transmitting unit comprising the pulleys and the belt, so that the power transmission is available to the spool 3 without being influenced by position or orientation of the spool motor. It is no longer necessary to alter designs in company with alteration in position of an idle gear caused by altering a gear ratio, so that plenty of optimum gear ratios may be arranged in response to fishing ways, not taking unnecessary cost.

According to the invention, it is possible to cancel the slippage owing abrasion caused between the pulleys and the belt by using for a long period of time, and avoid the working performance from deterioration.

By adopting the toothed belt of good power transmitting efficiency generating no slippage, it is possible to securely carry out instantaneously winding, stopping the winding or scooping in response to fishing conditions.

In particular, when using the electric fishing reel at the part intensive in abrasion receiving large load at the high speed rotation such as the power transmitting part from the spool motor to the spool, it is possible to restrain the working performance of the belt from deterioration and largely heighten the endurance of the reel.

What is claimed is:

1. A fishing reel comprising:

a reel main body including side plates;

a spool rotatably supported between the side plates;

a motor disposed at a front of the spool between the side plates;

a handle for rotating the spool which is provided at one of the side plates and is disposed at a rear of the spool;

a drive mechanism provided in the reel main body for driving the spool, the driving mechanism including, first and second pulleys mounted on first and second driving shafts, respectively, wherein the motor drives the first driving shaft, a belt including core wires therein for transmitting power from the first pulley to the second pulley, which is provided at a side of the other side plate, a planetary gear reduction mechanism through which the power from the second driving shaft through the belt is transmitted to the spool.

2. The fishing reel according to claim 1, wherein of the first and second pulleys and the belt constitute a power transmission unit for transmitting the power from the motor to the spool.

3. The fishing reel according to claim 2, wherein the motor is provided outside of the spool.

4. The fishing reel according to claim 2, wherein the first pulley disposed along the rotational axis of the motor, and the second pulley is disposed along the rotational axis of the spool.

5. The fishing reel according to claim 1, wherein at least one of said first and second pulleys is toothed, and the belt is toothed to be in mesh with the toothed pulley.

6. The fishing reel according to claim 1, wherein the belt includes a rubber and the core wires made of fiber having larger tensile strength than that of a belt base material of the belt.

7. The fishing reel according to claim 1, wherein a distance between the first and second pulleys is fixed.

8. A fishing reel comprising:

a reel main body including side plates;

a spool rotatably supported between the side plates;

a motor disposed at a front of the spool between the side plates;

a handle for rotating the spool which is provided at one of the side plates and is disposed at a rear of the spool;

a fishing-line winding mechanism for driving the spool and winding the fishing line on the spool, the fishing-line winding mechanism including first and second pulleys mounted on first and second driving shafts, respectively, wherein the motor drives the first driving shaft, a belt including core wires therein for transmitting power from the first pulley to the second pulley, which is provided at a side of the other side plate, a planetary gear reduction mechanism through which the power from the second driving shaft through the belt is transmitted to the spool; and a holding member fixed to the reel main body, for sealing an interior of the reel main body off from an exterior of the reel main body.

9. The fishing reel according to claim 8, wherein said first and second pulleys and the belt constitute a power transmission unit for transmitting the power from the motor to the spool.

10. The fishing reel according to claim 9, wherein the motor is provided outside of the spool.

11. The fishing reel according to claim 9, wherein the first pulley is disposed along the rotational axis of the motor, and the second pulley is disposed along the rotational axis of the spool.

12. The fishing reel according to claim 8, wherein at least one of the first and second pulleys is toothed, and the belt is toothed to be in mesh with the toothed pulley.

13. The fishing reel according to claim 8, wherein a distance between the first and second pulleys is fixed.

* * * * *